United States Patent
Del Ser González (10) Patent No.: US 6,572,466 B1
(45) Date of Patent: Jun. 3, 2003

(54) METHOD FOR THE SKINNING OF TUNA AND OTHER SPECIES FOR THE CANNING INDUSTRY AND DEVICE FOR ITS IMPLEMENTATION

(76) Inventor: Clemente Del Ser González, Avenida del Cobre, s/n, 28911 Madrid (ES)

( * ) Notice: Subject to any disclaimer, the term of this patent is extended or adjusted under 35 U.S.C. 154(b) by 2 days.

(21) Appl. No.: 09/889,441
(22) PCT Filed: Nov. 13, 2000
(86) PCT No.: PCT/ES00/00431
§ 371 (c)(1), (2), (4) Date: Jul. 12, 2001
(87) PCT Pub. No.: WO01/35753
PCT Pub. Date: May 25, 2001

(30) Foreign Application Priority Data

Nov. 12, 1999 (ES) ............................ 9902487
Jul. 14, 2000 (ES) ........................... 200001765

(51) Int. Cl.⁷ ............................................. A22C 25/17
(52) U.S. Cl. ............................................. 452/127
(58) Field of Search .................... 452/125, 129, 452/127, 119, 160

(56) References Cited

U.S. PATENT DOCUMENTS

| | | | |
|---|---|---|---|
| 1,905,578 A | * 4/1933 | Tucker | 99/590 |
| 3,838,478 A | * 10/1974 | Wulff | 452/119 |
| 3,881,406 A | * 5/1975 | Perez | 99/541 |
| 4,412,483 A | * 11/1983 | Hoegh | 99/537 |
| 5,181,879 A | * 1/1993 | Lapeyre et al. | 452/160 |
| 5,545,422 A | * 8/1996 | Davies et al. | 99/472 |
| 5,569,068 A | * 10/1996 | DeRoche et al. | 452/127 |
| 6,210,262 B1 | * 4/2001 | Burch et al. | 452/125 |

* cited by examiner

Primary Examiner—Thomas Price
(74) Attorney, Agent, or Firm—Koda & Androlia (57) ABSTRACT

The method involves turning the fish (4) around its own axis while a cutting blade is longitudinally displaced along the body of the fish and contacts the latter in such a way that the blade follows a helicoidal trajectory in relation to the skin of the fish thereby making it possible to fully skin the fish. To this end, the device has a pair of clamps (7–7') to fix the fish in vertical position and preferably with the head facing downward. The clamps are aided by a rotational actuator (10) delivering said movement to the fish while the blade (11) is permanently pressed on the fish by a spring (17) and is moved along the fish by a cylinder (16) or any other appropriate means. The arm (13) is rotated on a support (15) located at mid-height and can be displaced transversally by a cylinder (19) so that the blade can permanently work in an imaginary plane (21) perpendicular to the axis of the fish.

14 Claims, 6 Drawing Sheets

METHOD FOR THE SKINNING OF TUNA AND OTHER SPECIES FOR THE CANNING INDUSTRY AND DEVICE FOR ITS IMPLEMENTATION

OBJECT OF THE INVENTION

The present invention refers to a method for skinning tuna, bonito, swordfish, shark and other species used for the canning industry, its purpose is to make the removal of skin from these species highly automated, prior to the cutting up, dressing and canning of same. The invention also affects the device for the implementation of said method. Consequently, method and device are destined for the fish canning industry.

BACKGROUND TO THE INVENTION

As it is known, fishing for tuna and the other aforementioned species and similar, is carried out in high seas from refrigerator vessels, where an initial preparation phase is carried out on the fish, ie; gutting and washing for them then to be immediately put into refrigerating chambers where they are kept for the fishing season, until the fish is eventually unloaded at the canning factory or factories.

Part of the initial phase of preparation of the fish is removing its skin, for which there are, at present, two methods:

Manual skinning, which requires considerable labour, and hence it is usual for tuna boats and similar to turn to underdeveloped countries where labour is very cheap for help in carrying the already skinned fish to the canning factory. This means, in addition to the labour costs, considerable travelling in many cases, with the subsequent costs and time involved in travelling, throughout which the expenses for maintaining the vessel and its crew are maintained.

The other solution is to directly transfer the fish to the canning factory and subject it to chemical treatment there, using products to remove the skin, in such a way that labour is drastically reduced and at the same time no additional travelling is necessary for the boat in looking for areas with cheap labour costs. However, the fundamental problem with this system is the negative effect that such products produce on the fish, substantially altering its flavour and achieving an end product that, for the consumer, is much less attractive than when hand-skinned, and all this without considering the fact that, often, the chemical products used for skinning can leave waste material on the flesh, which can, in turn, be harmful to the consumer.

DESCRIPTION OF THE INVENTION

The method proposed by the invention allows mechanical skinning, ie; skinning that produces a similar product to that which is obtained by the traditional manual skinning process, but with minimum labour, and, as a consequence, production costs that are considerably lower and the implementation of which takes place in the canning factory, although, whenever considered necessary, may take place on the fishing boat itself.

To this end and more specifically, this method is carried out in the following way:

The frozen fish is taken by its head and tail and is placed preferably vertically Laterally to the fish and approximately corresponding with its mid section, a knife is placed on the surface of the fish at a certain angle and with certain elastic tension.

The fish is rotated on its imaginary axis

The knife is subjected to a tilting movement from one extremity of the fish to the other, with a parallel movement, in such a way that the knife is kept permanently on a level passing through the axis of the fish The breadth of movement of the knife corresponds with the length of the fish, referring to the area of the fish to be skinned, in such a way that the combined movement of the knife, on the one hand, and of the fish on the other, generates a spiral action of the knife on the periphery of the fish affecting the entire surface of the fish.

When the skinning has been completed the movement of the fish is stopped, the knife is separated and the fish is taken from its fastening.

Given that, as mentioned previously, the skinning operation takes place when the fish is still frozen, there is the option of using hot water, steam, hot air or any other heat-producing method, that momentarily lessens the degree of freezing on the skin of the fish, in order to assist the knives' cutting action.

The device planned for the implementation of the method is made up of a rotating turntable or is on a linear chain, on which one or more loading stations are set up, with their respective skinning stations, which in the first case, on the rotating turntable, will be diametrically opposite one another, and at each there will be two clamps to secure the fish, in vertical alignment, connected to a common rotating device and having the means to regulate the distance between them in order that this distance can be made to accommodate the different sizes of fish.

Said knife is placed laterally to the fish which will be in the shape of a glass, ie, cylindrical, hollow and open at its cutting edge, which will be placed to correspond with the imaginary opening of the glass, said edge or blade preferably having many internal facets or rabbets, half-moon shaped, equally distributed, very closely together, in order to achieve the best cutting conditions.

The shaft of the knife will be assembled with freedom of rotation on a supporting arm and aided by a motor transmitting a rotating movement of said knife on its own geometrical axis, said arm assembled to tilt on a support allowing the knife to move from one extremity of the fish to the other as it turns, as a result covering the entire surface thereof in a spiral cutting strip.

Said arm will also be permanently pressed against the body of the fish, by means of a spring or similar, so that the knife incise the latter with a level of penetration determined by a shoe or press which moves equally over the surface of the fish as it rotates.

As a complement to the described structure and given that the length of said supporting arm for the knife is invariable, in order for said knife to be effective at any point along the length of the body of the fish, the section and distance of which varies substantially in relation to the pivoting shaft of the arm, it is planned that the support of said arm should be assembled so that it can be moved transversally, activated, for example, using a cylinder or similar, so that the knife is nearer the fish corresponding with both extremities of same and is retracted as it reaches its mid section, specifically remaining on a plane passing through the axis of the fish, to which end, a sensor, also acting on the surface of the fish, continuously sends positional control signals from the knife to the cylinder causing the transversal movement of the support.

Both work stations set up on the rotating turntable can be identical, ie; both being supplied with the aforementioned cutting unit, in such a way that said cutting unit be inoperative in the loading station and operative in the skinning station, or said cutting unit may be set up in the skinning station exclusively.

In accordance with another preferred embodiment of the invention is the use of several skinning knives, working simultaneously, each one affecting a section of the body of the fish, so that, on the one hand, its mobility is considerably reduced and, on the other, the skinning speed is markedly increased.

It is also planned that the knives, instead of the aforementioned glass shape, be in a circular, serrated disc framed by a pair of turntables of a lesser diameter and with a perfectly smooth edge, which, when rotating with the knife itself, act like fences to the penetration of the latter in the body of the fish, and consequently having the means to set the depth of skinning.

Here, it is also planned that the different knives be attached to respective tilting arms assembled co-axially on the frame of the machine and activated simultaneously by a single engine, which transmits the movement of the knives through the hollow interior of the arms themselves, each of which is assisted by a twin effect pneumatic cylinder, which, on the one hand adequately presses the respective knife on the body of the fish during the skinning phase, and on the other, tilts the respective arm into a situation where it is inoperative, leaving the area where the fish is processed perfectly free for removing the skinned fish and substituting it for another.

It is also planned that each knife have a sluice-way, into which it throws the remains of skin taken from the fish, running into the different sluice-ways, at different heights, like the knives themselves, in a lateral, vertical and fixed collector which, in turn, runs into any suitable container underneath.

For this vertical movement of the knives along the length of the body of the fish, a bridge is set up on the frame of the machine, which is vertically mobile using a system of spindles and the respective motor, on the bridge are assembled the support arms for the knives and all their accessories.

Finally and for the purpose of fastening and moving the fish, the frame should have a rotating support at a low level, mounted on vertical guides and operated using a cylinder, said support having a lower motor that activates a clamp or flange with a pointed and serrated opening to be used to hold the head of the fish, vertically and with its tail pointing upwards, which is simply fitted inside a yoke-shaped support, able to rotate freely over the frame, in such a way that, because the lower rotating support can be moved at a height, it is very easy to implant the fish and it can be secured whatever its size, by lifting said lower rotating support to a greater or lesser degree, the upper yoke being slightly movable at a height because of the pressure exerted by the frozen fish at the final phase of fastening, in order to act on a sensor that keeps the knives inoperative until the fish has been correctly and definitively implanted into the machine.

For the rest, the machine will have electrical and pneumatic automated mechanisms so it may be operated correctly from a control panel.

DESCRIPTION OF THE DRAWINGS

To complement this description and with the object of assisting better understanding of the features of the invention in accordance with a preferred example of the practical embodiment of same, a set of drawings, that are illustrative and not limiting in character, accompanies said description as an integral part thereof, where the following are shown.

PREFERRED EMBODIMENT OF THE INVENTION

Figure 1:
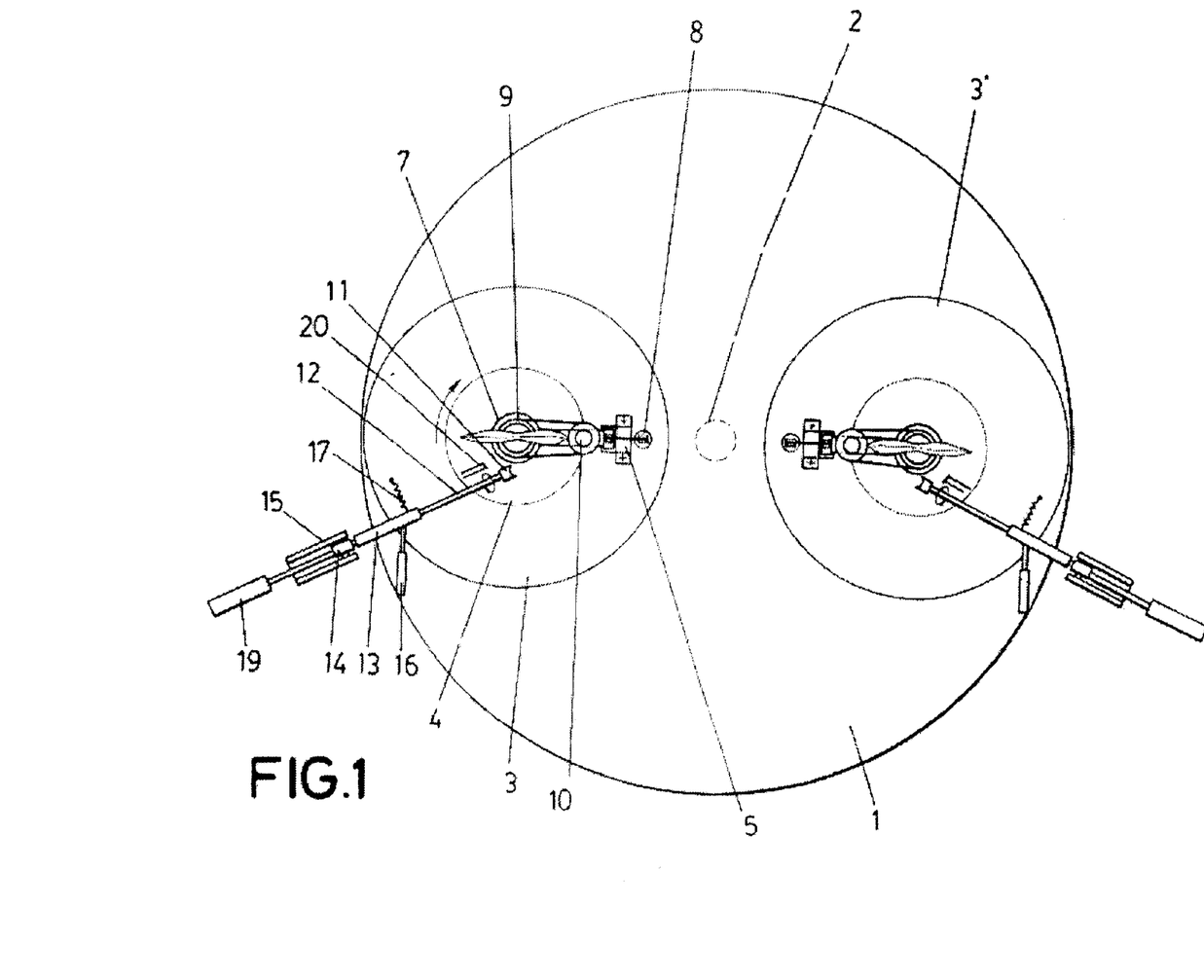
FIG. 1.—Shows a schematic plan view of a device for the implementation of the method for the skinning of tuna and other species object of the present invention FIG. 2.—Shows, also as a schematic representation, a side elevation view of the device from the previous figure FIG. 3.—Shows a representation similar to that of FIG. 2 but for the final phase of skinning FIG. 4.—Shows a frontal perspective view of a machine for skinning tuna and similar shown in accordance with the aforementioned alternative practical embodiment of same FIG. 5.—Shows, also as a perspective view, an enlarged detail of the machine from the previous figure at the level of the cutting area FIG. 6.—Shows, finally, a rear-side perspective view of the same machine from FIGS. 4 and 5.
Figure 2:
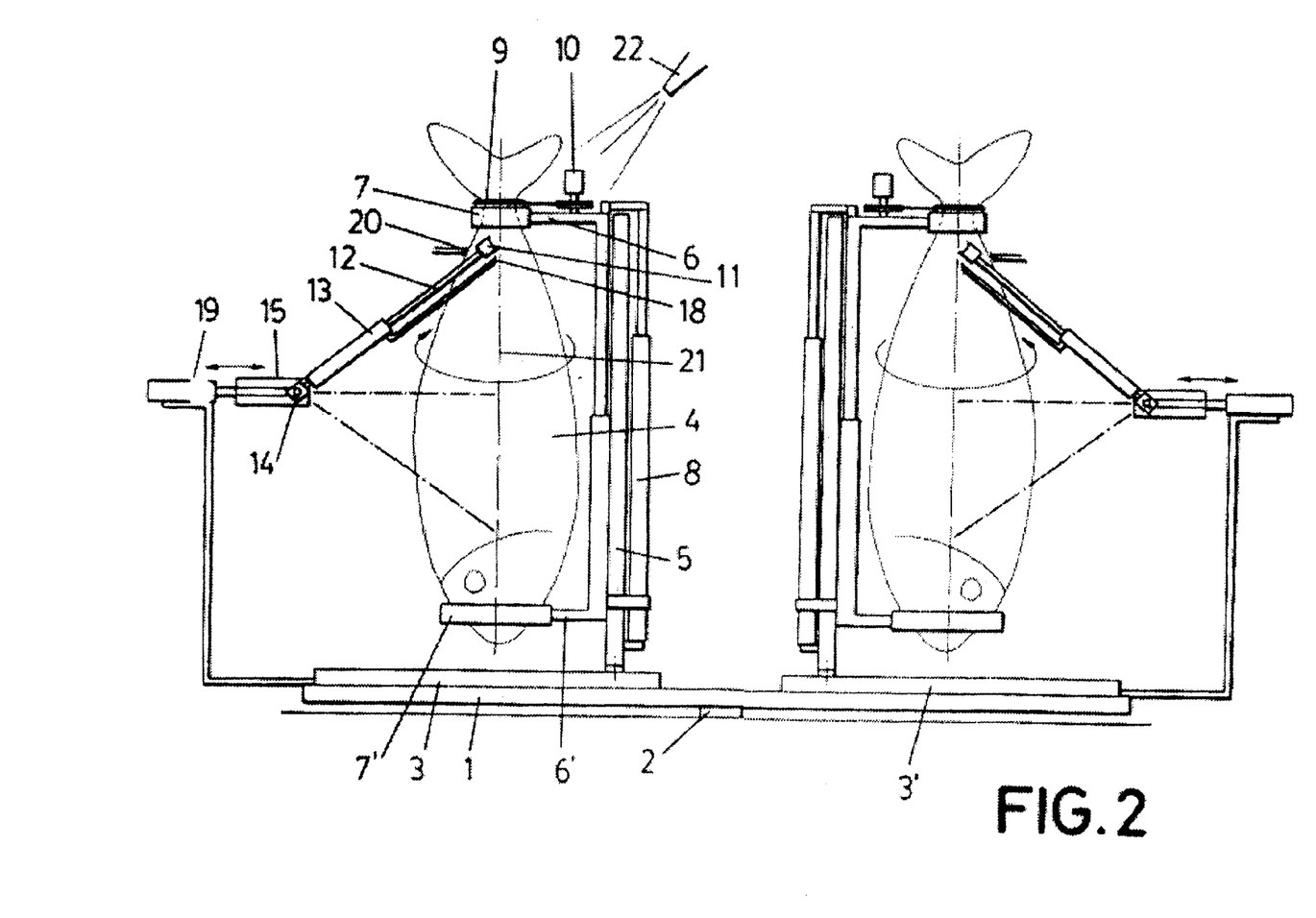
Figure 3:
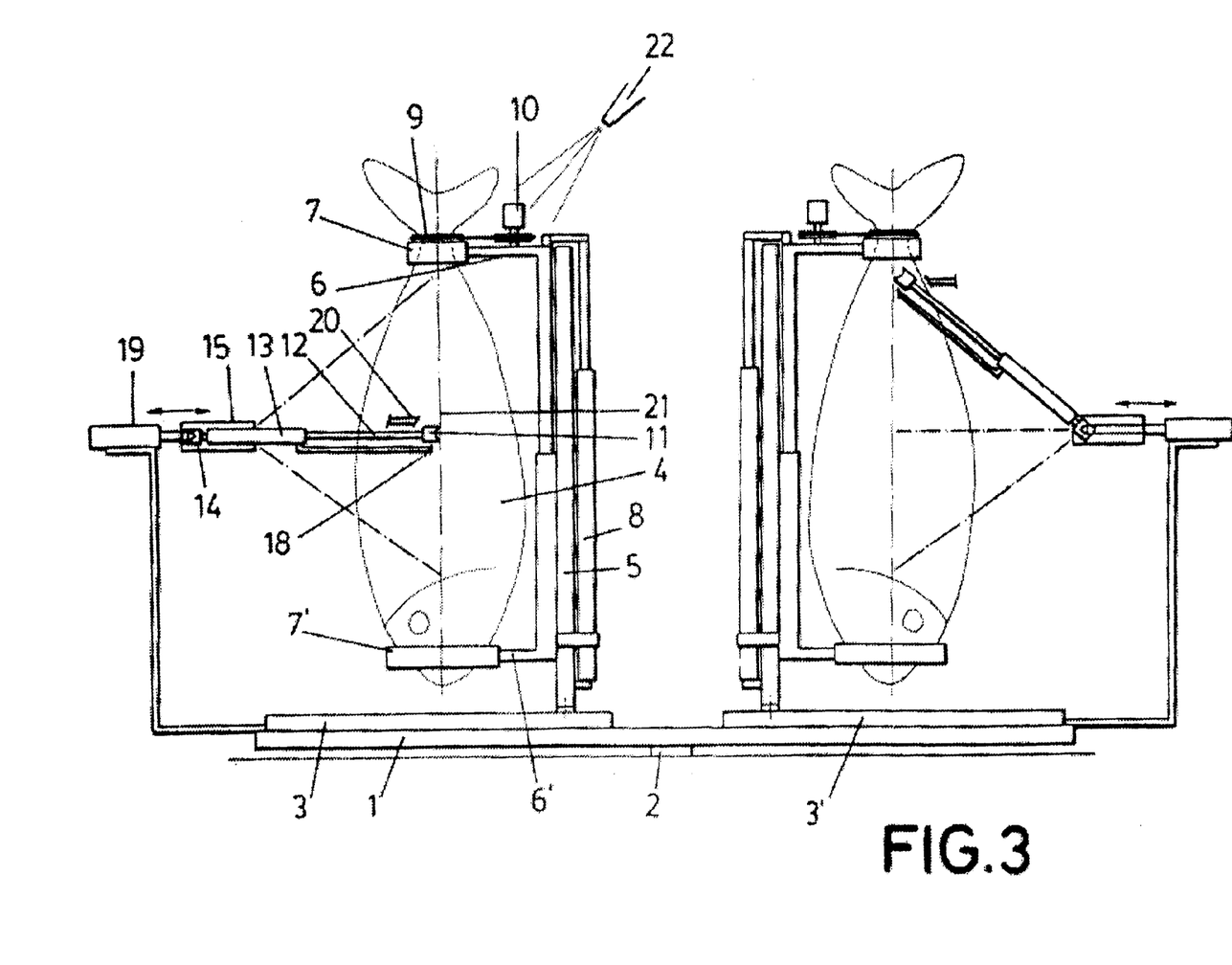

Looking at these figures, specifically from FIGS. 1 to 3, it can be seen how the device for implementing the method of the invention is structured from a horizontal turntable (1), able to turn intermittently on its axis (2), 180° rotations to be specific, there being on said turntable (1) at least two work stations (3–3'), diametrically opposite one another, one for loading and one for skinning, in such a way that whilst the fish is being fastened on to the first (4) to its appropriate support (5) at the other, the fish is being skinned.

Obviously and depending on the machine's intended operative capacity, two or more loading stations may be set up on the rotating turntable, grouped on a half-turntable and several other skinning stations on another half-turntable, in such a way that several fish may be loaded simultaneously by the respective operatives, whilst at the other side of the turntable several others are being skinned automatically, the turn-table continuing to rotate intermittently at angles of 180°. Obviously, the different work stations (3–3') can also be set up in line, in a chain type system.

In any case, the support (5) for the fish (4) perpendicular to the turntable (1) will be adjustable in length to fit different sizes of fish and will have arms (6–6') at both ends with their respective opening clamps (7–7'), the first for securing the fish (4) at the area next to its tail fin and the second at its head, both co-axially, so that the fish is in the vertical position shown in FIGS. 2 and 3. In order to make the support (5) adjustable in length, a telescopic structure could be introduced so that both sections are connected via a hydraulic or pneumatic cylinder (8) that would set the distance between the clamps (7–7') to suit the needs of each case.

The clamps (7–7') fixed to the support (5) must have movable collars inside so that the fish can be rotated (4), attached to one of which will be a means of transmission (9) which, using a motor (10) or any other suitable motorised part, will cause the fish to rotate in a suitable fashion.

Along with the described structure there will be a knife (11) preferably cylindrical, hollow and open at its cutting edge, attached axially at its closed base to an shaft (12) assembled with freedom of rotation inside a tubular arm (13), further on from which will be the respective motor (14) which will supply the knife with a rotating movement on its own shaft to permit cutting.

Each arm is (13) assembled to tilt on a support (15) and is aided by a lateral cylinder (16) or any other suitable driving means to allow the arm itself to tilt (13) and consequently the knife (11) from the upper extremity of the fish (4) as shown in FIG. 2, to the lower extremity of the fish as shown, in turn, by FIG. 3, the cylinder being able to act simultaneously (16) as a means of pressing the knife (11) against the body of the fish, or this objective being achieved by an auxiliary spring (17), in such a way that the level of the knife's (11) penetration into the body of the fish is determined by a shoe or press (19) which, placed near the knife (11) is permanently supported on the body of the fish.

As can be seen by looking at FIG. 2, if the arm (13) were supplied the aforementioned tilting movement alone, the knife (11) would only work on the extremities of the fish (4), being substantially distanced from it at its mid section, hence, it is planned that the support (15) be mounted on a transversal guide and aided by a driving cylinder (19) receiving information at all times from a sensor (20) accompanying the knife (11) as it moves along the length of the fish and supplying information to the cylinder (19) so that it responds ensuring that the longitudinal movement of the knife (11) to the body of the fish is achieved on an imaginary plane (21) passing through the axis of the fish, ie; the knife (11) keeping continuous contact with the body of the fish (4) and in the best cutting conditions.

In order to facilitate cutting, the device may be supplied with a nozzle (22) to supply hot air or any other thermal means to cause a degree of surface defrosting to the body of the fish (4).

In accordance with the described structure, operation of the device is as follows:

At the loading station (3), the fish is secured (4) vertically and with the head facing downwards, by closing the clamps (7) on the extremities of same as shown in FIG. 2.

After securing the fish (4) on the aforementioned loading station (3) the main turntable (1) turns 180° in such a way that said loading station (3) comes to take up the skinning position, while the operative group at the skinning station (3') goes to take up that position where, at said skinning station (3'), the arm (13) supporting the cutting knife (11) starts to tilt until the latter is supported on the body of the fish at one of its extremities, for example in the upper extremity position shown in FIG. 2, at which time the motorised part (10) rotates the fish (4) while the knife (11) rotates on itself as the arm (13) tilts downwards in such a way that said knife (11) follows a spiral path on the surface of the fish with a degree of penetration or cutting determined by the adjustable shoe (18) and with progressive retraction of the knife (11) via the cylinder (19) until said knife reaches the mid section of the fish, to then move in the opposite direction in order to maintain the aforementioned cutting plane (21), in accordance with the signals generated by the sensor (20).

During the skinning operation at the appropriate station (3'), the skinned fish will have been removed from the clamps (7–7') at the loading station (3), and it will have been replaced by another fish, which after the skinning operation has been completed at the other station, will be ready to go there via the aforementioned 180° rotation of the turntable (1).

Figure 4:
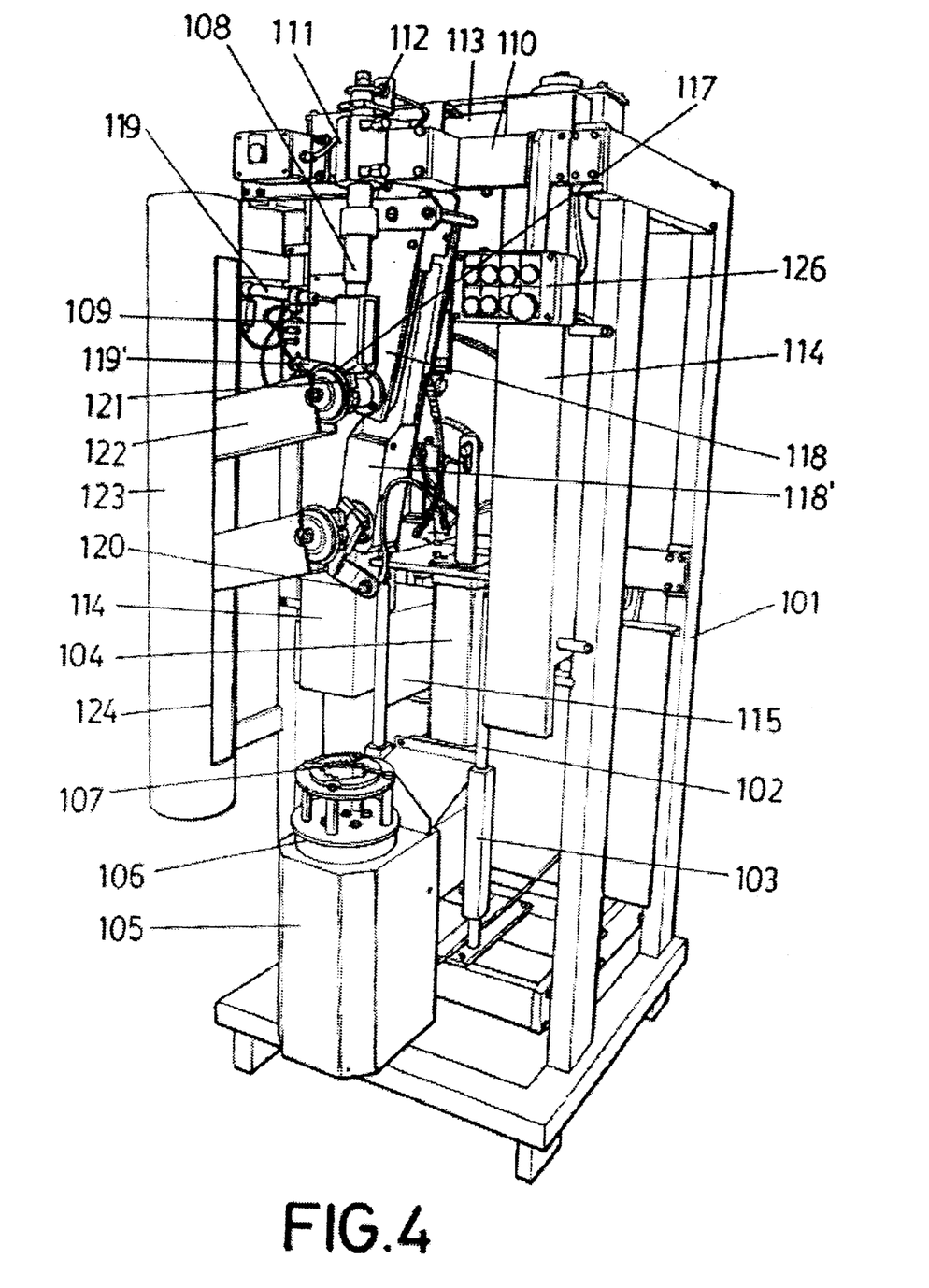
Figure 5:
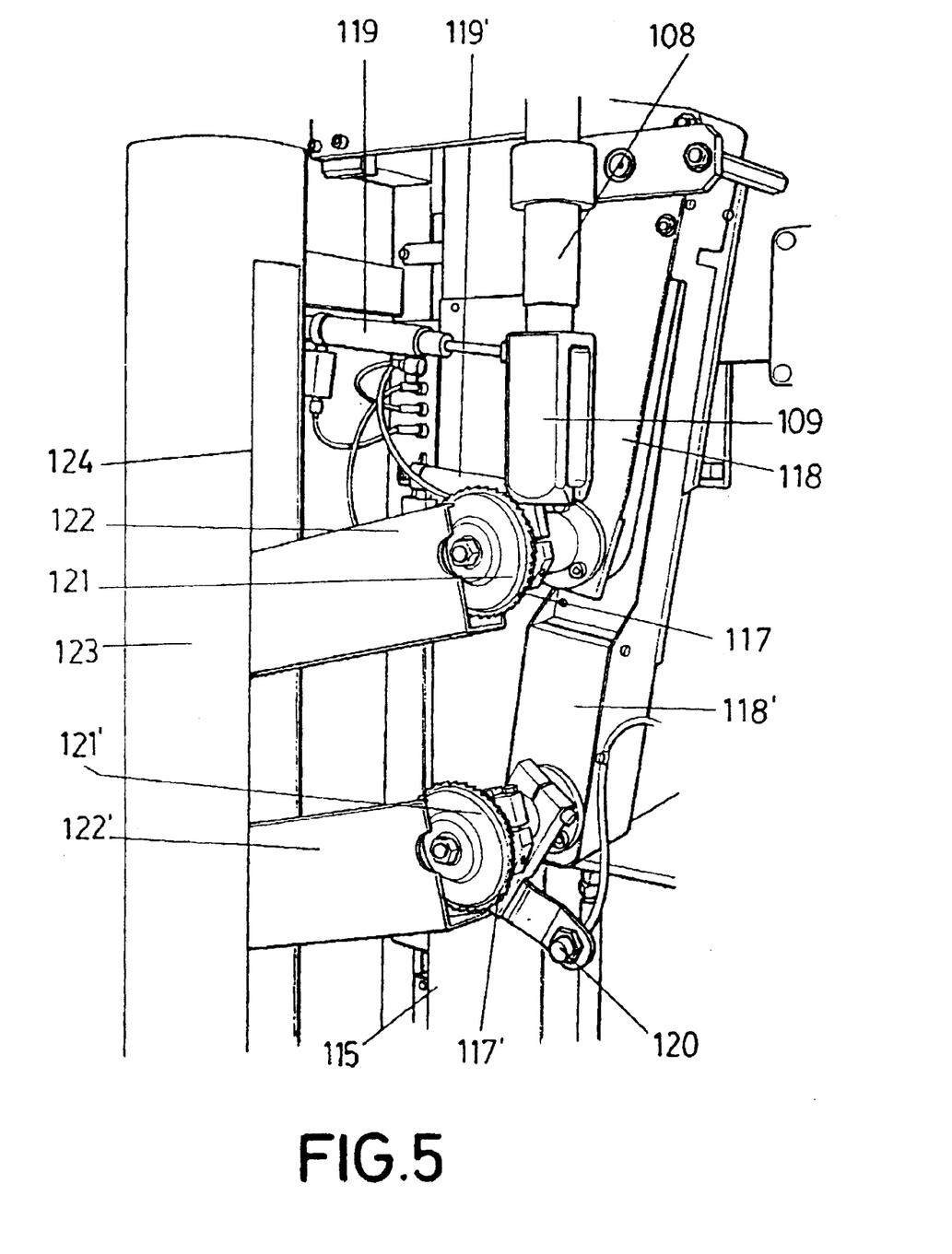
Figure 6:
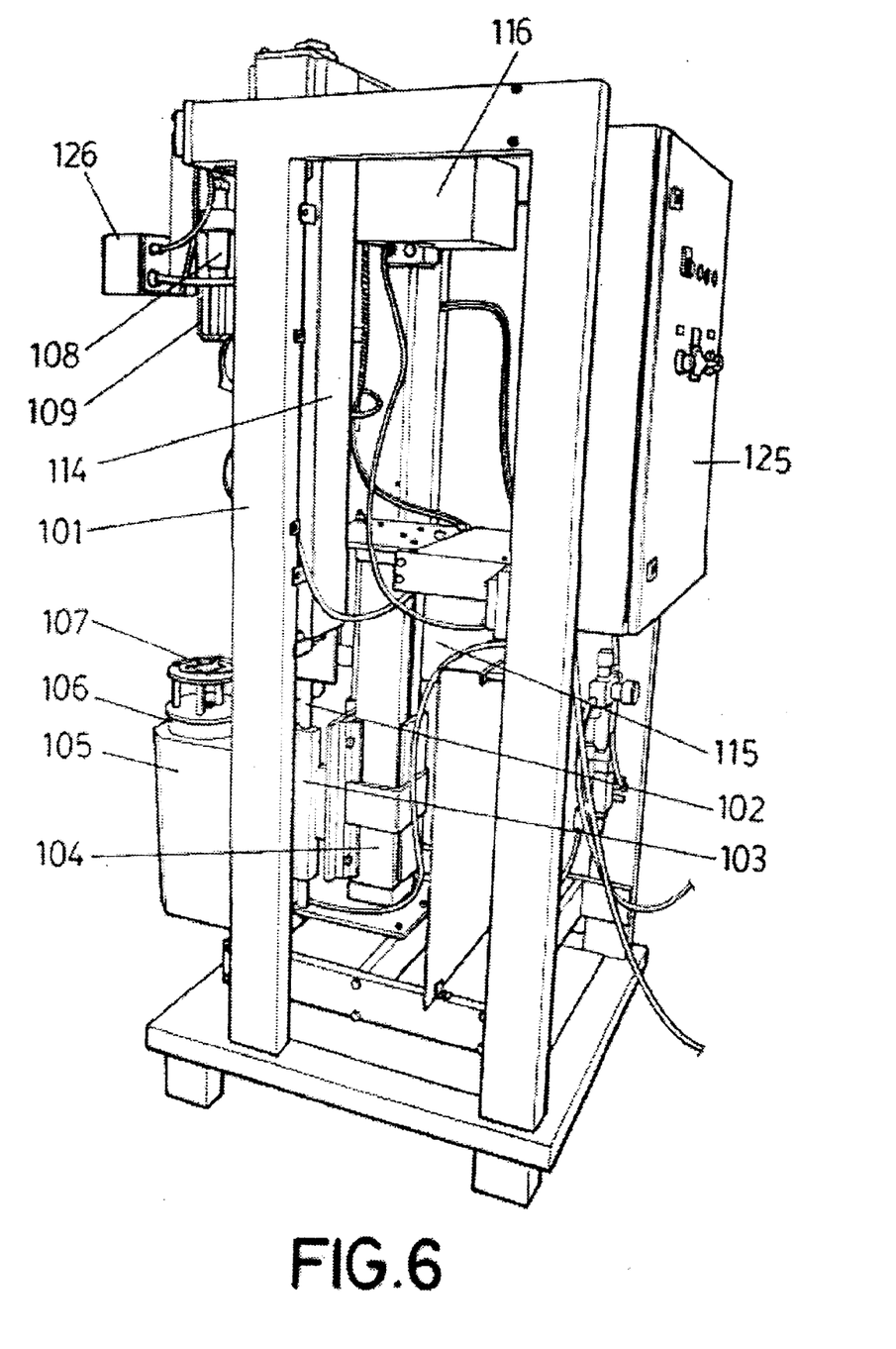

In accordance with the alternative practical embodiment shown in FIGS. 4 to 6, where the machine has one single work station, this machine is supplied with a strong frame (101) vertically lengthened where at a lower front level a pair of vertical guides are set up (102) for a support (103) to be moved in this direction using a pneumatic cylinder (104), a support (103) having a casing at the front (105), inside which is accommodated the motorised part of a clamp or flange (106) which, in addition to securing the fish by its head supplies it with the necessary rotating movement for it to be skinned, to which end said clamp or flange (106) has a pointed opening (107) with serrated edges, ensuring both perfect insertion of the head of the fish and correct fastening of same by simple gravity.

Securing of the fish is completed using an upper support (108) ending in a yoke (109), with its opening facing downwards, designed to take the tail of the fish, this upper support (108) being assembled on an upper and fixed crossbeam (110) of the frame (101) through a collar (111) allowing some upward movement of the support (108), which is pressed by the body of the fish during the lifting of the lower support (105) in order to act on a position sensor (112) impeding activating the machine's skinning device should the fish not be properly inserted therein.

Thus, due to the fact that the lower support may be adjusted at a height (105), said support (105) is distanced from the upper support (109) to a sufficient extent to allow the fish to be inserted easily, and later to bring these two supports together to any size required by the length or body size of the fish, rigid due to its frozen state.

Now, to move on to the means of skinning, on the upper area of the frame (101) it is planned that there should be a mobile transversal bridge (113) also movable on vertical guides (114), appropriately placed on the frame (101), specifically using at least one spindle activated by a power unit (115), there being another power unit (116) set up on said mobile bridge (113) transmitting movement simultaneously to a pair of knives (117–117') through the hollow interior of the respective arms (118–118'), in such a way that these knives (117), moving continuously during the cutting phase, may be moved the length of the appropriate half of the fish, via the movement of the head itself (113) due to the effect of the motor (115), at the same time as they are kept in constant contact with the fish, irrespective of the anatomical variations thereof, in its rotating movement due to the effect of respective twin effect pneumatic cylinders (119–119'), which, during the cutting phase adequately press the respective arms (118–118') against the fish, so that the knives act as a consequence (117–117') and so that, in the phase of replacing the fish, they pull the arms (118) outwards, so that these, and, as a consequence, the knives, leave the handling area totally free.

A sensor (120) placed at a lower level to the longest arm (118'), detects the end of the path over the body of the fish sending the appropriate control signal to the motor (115) so that it is stopped in the descent of the mobile bridge (113) and the knives are returned to their upper limit position.

The knives (117–117'), as can be seen especially well in the enlarged detail of FIG. 5, are made in a circular disc with a serrated edge that is framed by two plates (121), of a lesser diameter and smooth edge, acting as fences to the knives' penetration into the body of the fish. Additionally, each knife (117–121) is assisted by a sluice-way (122) for waste, that goes with the knife as it moves and which runs into a vertical, fixed collector (123) which channels the waste into any receptacle or container, for which purpose said collector (123) has a longitudinal groove (124) in line with one of its generators, allowing free movement of the aforementioned sluice-ways (122) along the length thereof.

The machine should be connected to a pressure source as can be seen from FIG. 6, for activating the pneumatic mechanisms, while the electrical circuit governing the same is contained in a rear cabinet (125), receiving commands via a control panel (126) situated at its front face.

What is claimed is:

1. A method for the skinning of fish of a species selected from a group consisting of tuna, bonito, swordfish and shark which is used by the canning industry and having as its aim the achievement of mechanised skinning to a highly automated level, in the removal of skin from said fish, comprising the ordered steps of:

freezing the fish;

securing the frozen fish by its head and its tail and a longitudinal axis extending through said head and tail is placed in a vertical orientation, laterally to the fish, situating at least one knife to press on the surface of the fish at a certain angle of inclination and with certain elastic tension, rotating said fish about said longitudinal axis, moving said knife in the direction of the longitudinal axis in such a way that the combination of the two aforementioned movements the linear movement of the knife and the rotation of the fish, generate a spiral action of the knife on the periphery of the fish affecting the entire surface thereof, and when the skinning itself has been completed, stopping he movement of the fish, separating the knife from the fish and detaching the fish from its fastenings.

2. The method for skinning fish, for the canning industry, according to claim 1, characterised in that when skinning takes place on frozen fish, heating the frozen fish, using hot water, steam, hot air or any other heat-producing means to momentarily reduce the level of freezing in order to assist the knives' cutting.

3. The device for the implementation of the method of claim 1 or 2, characterised in that there is a rotating turntable (1), which can be substituted by an appropriately motorised linear chain to make intermittent movements, should there be the aforementioned turntable of 180°, there would be at least two work stations (3–3') diametrically opposite each other on said turntable, one for loading/unloading the fish (4) and the other for skinning of same, it being planned that in each of these stations (3–3') there should be a support (5) for holding the fish (4), in a vertical position, with the aid of a pair of clamps (7–7'), adjustable to fit the size of the fish, designed to secure the latter by the area near its tail fin and by its head, preferably with the latter facing downwards, these clamps being aided by an actuator (10) that rotates the fish (4) working along with said support for the fish is a knife (11) which is able to work on the surface of the same laterally and obliquely and run over said surface from one extremity to the other of the fish in such a way that the rotating movement of the fish combined with the lineal movement of the knife cause a relative spiral movement between the knife and the fish, making said knife run the entire surface of the fish.

4. The device for the implementation of the skinning method according to claim 3, characterised in that the knife (11) adopts a glass shape, with its cutting edge at the level of the opening and attached axially at the centre of its closed base to a shaft (12) assembled with freedom of rotation on a tubular arm (13) and activated by a motor (14) which supplies the knife with a rotating movement, said arm (13) tilting in such a way that as a spring (17) keeps the knife continuously pressing against the surface of the fish while a shoe or press (18) determines the degree of penetration of the knife into the body of the fish, a cylinder (16) moves the knife (11) the length of the fish from the tail fin extremity to the head extremity.

5. The device for the implementation of the skinning method according to claim 4, characterised in that the support on which the knife's tilting arm is assembled, which is placed halfway in height between the clamps (7–7') is, in turn, assembled on a transversal guide and activated by a cylinder (19) which, according to information supplied by a sensor (20) accompanying the knife (11) as it moves detecting the profile of the fish, causes movement of said support (15) in order for the knife (11) to make a path over the surface of the fish included in an plate (21), passing through the axis of same.

6. The device for the implementation of the skinning method according to claim 5, characterised in that at each work station (3–3'), or at least at one of them there is a nozzle (22) for bringing a hot fluid that will generate a degree of superficial defrosting to the fish, to facilitate the knife's cutting (11).

7. The device for the implementation of the method of claim 1 or 2, characterised in that laterally to the fish there are at least two knives (117) at a suitable distance apart to share in the operation along the length of the fish.

8. The device for the implementation of the skinning method of claim 7, characterised in that each knife (117) is disc-shaped, with a serrated edge and is framed by two lateral plates (121) which rotate together with it, of a lesser diameter and smooth edged, acting as fences to the penetration of the knife itself into the body of the fish.

9. The device for the implementation of the skinning method of claim 8, characterised in that each knife (117) is assisted by a sluice-way (122), which accompanies said knife in its movements over the body of the fish, a sluice-way running into a collector (123) fixed to the frame (101) of the machine.

10. The device for the implementation of the skinning method of claim 9, characterised in that at a lower frontal level of the frame a support (103) is set up, moveable vertically on guides (102) with the help of a pneumatic cylinder (104), a support (103) attached to which is a casing (105) containing a power unit for a rotating part (106) holding a flange or clamp (107), pointed in shape with serrated edges, designed to receive the head of the fish by fitting together, along with another upper support (108), assembled with freedom of rotation on the frame (101) and ending at the lower extremity in a yoke (109) designed to receive the tail of the fish.

11. The device for the implementation of the skinning method of claim 10, characterised in that the upper support (108) is assembled wit the ability to move vertically inside a collar (111) connected to the frame (101) in order to be moved upwards, being pushed by the tail of the fish which activates a position sensor (112) which unblocks the cutting mechanisms.

12. The device for the implementation of the skinning method of claim 11, characterised in that there is an upper transversal, mobile bridge (113) on the frame (101), which can be moved on vertical guides (114) with the help of a motorised part (115) and at least one spindle or similar, a power unit (116) being attached to said bridge (113) to activate the cutting knives (117), which are at the end of arms (118) of different length, all of them assembled to tilt on the bridge (113), simultaneously receiving movement from said motorised part (116) and supplied inside with suitable means of transmission to the knives (117).

13. The device for the implementation of the skinning method of claim 10, characterised in that the tilting arm (118') which is the longest, has a position sensor (120) at its upper extreme which detects reaching the lower extremity of the fish, to stop the movement of the power unit (115) and the resulting descent of the bridge (112) and the arms attached to same.

14. The device for the implementation of the skinning method of claim 13, characterised in that each of the titling arms (118) holding the knives (117), is assisted by a twin effect cylinder (119), in such a way that each cylinder presses the appropriate knife (117) onto the body of the fish, in the cutting phase, causing lateral and outward tilting of the arms (118) when the knives are inoperative (117) to leave the loading and unloading area of the frame (101) free.

* * * * *